United States Patent
Oyama

(10) Patent No.: US 8,279,468 B2
(45) Date of Patent: Oct. 2, 2012

(54) PRINTING DEVICE AND NETWORK PRINTING SYSTEM

(75) Inventor: Takayuki Oyama, Mihama-ku (JP)

(73) Assignee: Seiko I Infotech Inc. (JP)

( * ) Notice: Subject to any disclaimer, the term of this patent is extended or adjusted under 35 U.S.C. 154(b) by 1438 days.

(21) Appl. No.: 11/893,886

(22) Filed: Aug. 17, 2007

(65) Prior Publication Data

US 2008/0212126 A1  Sep. 4, 2008

(30) Foreign Application Priority Data

Sep. 22, 2006 (JP) ................................. 2006-257721
May 28, 2007 (JP) ................................. 2007-140510

(51) Int. Cl.
  *G06K 15/00* (2006.01)
(52) U.S. Cl. .................. 358/1.15; 358/1.16; 358/1.6
(58) Field of Classification Search ............. 358/1.15, 358/1.16, 1.6; 709/205, 206; 710/7, 20
See application file for complete search history.

(56) References Cited

U.S. PATENT DOCUMENTS

| | | | |
|---|---|---|---|
| 6,040,789 A * | 3/2000 | Nishida et al. ................ 341/50 |
| 6,567,180 B1 * | 5/2003 | Kageyama et al. ........... 358/1.15 |
| 6,842,263 B1 * | 1/2005 | Saeki ........................... 358/1.15 |
| 7,787,143 B2 * | 8/2010 | Fukuda ......................... 358/1.16 |
| 2003/0123104 A1 * | 7/2003 | Sasakuma et al. ............ 358/474 |
| 2005/0012966 A1 * | 1/2005 | Mitchell et al. ............... 358/440 |
| 2005/0134903 A1 * | 6/2005 | Tanimoto et al. ............ 358/1.15 |
| 2006/0023253 A1 | 2/2006 | Byun et al. .................... 358/1.15 |
| 2006/0061792 A1 * | 3/2006 | Kim et al. ..................... 358/1.13 |
| 2006/0170963 A1 | 8/2006 | Aoki ............................. 358/1.15 |

FOREIGN PATENT DOCUMENTS

| | | |
|---|---|---|
| JP | 2003312066 | 11/2003 |
| JP | 2004152088 | 5/2004 |
| JP | 2004297392 | 10/2004 |

OTHER PUBLICATIONS

"Using a Facsimile Machine as a System Printer" IBM Technical Disclosure Bulletin, IBM Corp. New York, US, vol. 33, No. 10A, Mar. 1, 1991, pp. 71-74, XP000109964.

* cited by examiner

*Primary Examiner* — King Poon
*Assistant Examiner* — Lawrence Wills
(74) *Attorney, Agent, or Firm* — Adams & Wilks

(57) ABSTRACT

A printing device connects to at least one client computer via a network. The printing device includes a storage section that stores image formats for general-purpose image format data. A control section converts page description language (PDL) data sent via the network from the at least one client computer into pixel map format data, converts the pixel map format data into general-purpose image format data based on one of the image formats stored in the storage section, and sends via the network to the at least one client computer the general-purpose image format data together with a source information file containing source information indicating the source of the PDL data. A memory section stores the pixel map format data obtained through the conversion performed by the control section. A printer prints the pixel map format data.

15 Claims, 3 Drawing Sheets

PRINTING DEVICE AND NETWORK PRINTING SYSTEM

BACKGROUND OF THE INVENTION

1. Field of the Invention

The present invention relates to a printing device including a printer function or a printer connected to a client computer through a network, and a network printing system including the printing device.

2. Related Background Art

In conventional techniques, as means for using image data for printing at an external computer, a network printing system is disclosed in JP 2001-270167 A. In this network printing system, a printing device connected to a client computer through a network converts page description language (PDL) data sent from the client computer into general-purpose print format data (intermediate format data for generating pixel map format data), holds the general-purpose print format data, converts the general-purpose print format data into pixel map format data, prints the pixel map format data, and, in response to a reference request sent from the client computer, sends the general-purpose print format data to the client computer.

In the conventional technique, in order to use the image data for printing at the client computer, the client computer needs to issue a reference request to the network printing system. There is a problem in that when the technique is used under an environment in which PDL data is asynchronously sent from an unspecified number of client computers to the printing system connected to the network, it is not easy to obtain a desired image because the client computers cannot recognize the time when desired image data is prepared at the printing system.

Further, it is difficult to determine whether an obtained image is a desired image because it is not easy to determine the client computer that has sent PDL data from which the obtained image is generated.

SUMMARY OF THE INVENTION

It is an object of the present invention to provide a printing device and a network printing system capable of effectively using image format data by performing conversion to desired image format data, automatically sending the desired image format data, and specifying a source of the image format data, in order to use pixel map data for printing at an external computer.

As means for solving the above mentioned problems, a printing device connected to a client computer through a network is characterized by including: a control means for converting PDL data sent from the client computer, serving as a print requester, into pixel map format data; a memory means for upholding the pixel map format data; and a print engine for printing the pixel map format data on a sheet.

The printing device is characterized in that the control means converts the pixel map format data into general-purpose image format data such as Tagged Image File Format (TIFF) data and performs control such that the image format data is sent, via a network communication means, to the client computer serving as a transmission destination specified in advance through an input means.

The printing device is characterized in that the control means automatically selects a client computer that satisfies a condition specified in advance, from among multiple client computers specified in advance through the input means, and automatically sends the image format data.

The printing device is characterized in that the control means automatically sends, together with the image format data, information indicating the source of the PDL data, such as the file name of the PDL data, the print requestor name thereof, and the IP address of a client computer that has sent the PDL data.

According to the present invention, when the printing device receives PDL data and generates pixel map format data, conversion to image format data and transmission of the image format data is automatically performed, so a client computer that desires an image does not need to issue a reference request for image format data to the printing device.

Further, according to the present invention, a condition to send image format data and a transmission destination client computer can be specified in advance through the input means of the printing device, so it is possible to send only a required image to the client computer that desires the image format data.

Further, according to the present invention, information indicating the original PDL data from which image format data is generated can be sent together with the image format data. Thus, the client computer that has received the image format data can associate the received image format data with the PDL data or the client computer that has sent the PDL data, thereby effectively using the image format data.

DETAILED DESCRIPTION OF THE PREFERRED EMBODIMENTS

Figure 1:
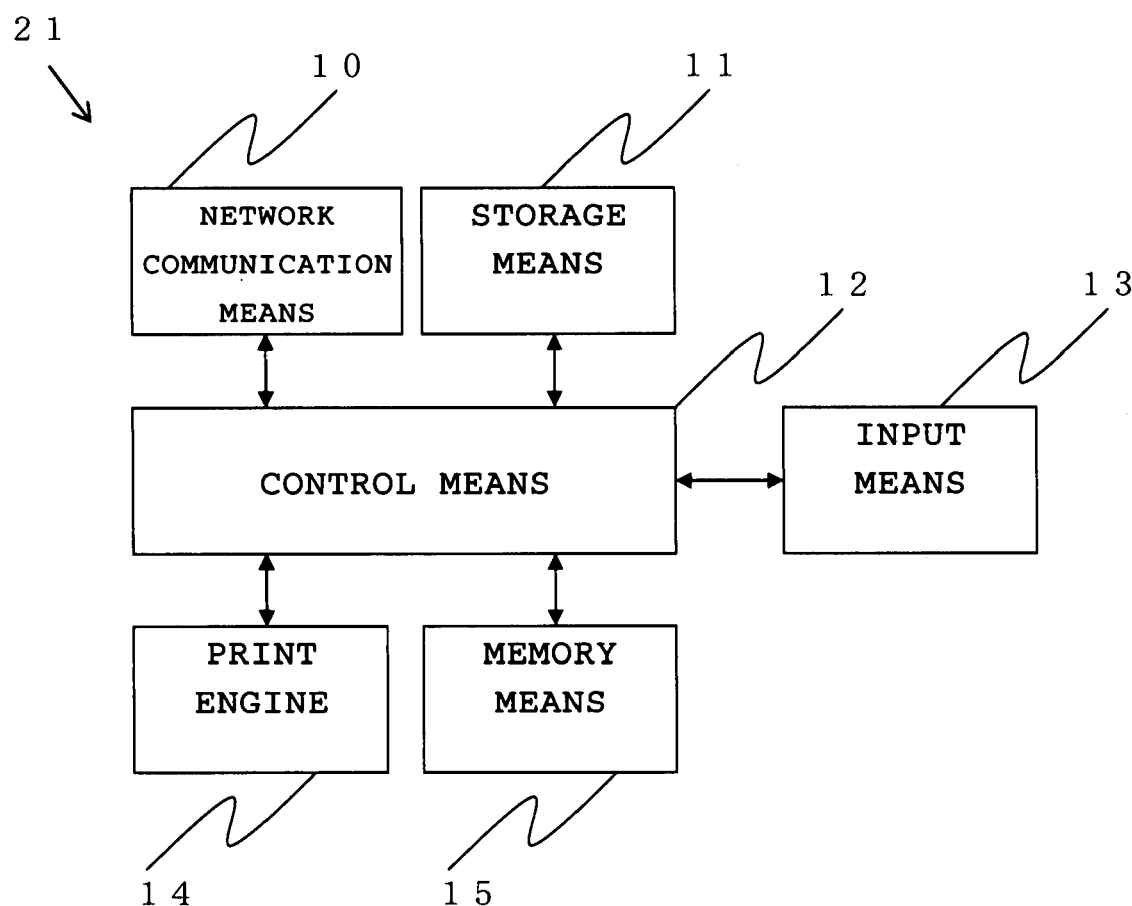
FIG. 1 is a block diagram showing an entire configuration of a printing device according to an embodiment of the present invention.

Next, an embodiment of the present invention will be described in detail. FIG. 1 is a block diagram showing an entire configuration of a printing device according to the embodiment of the present invention. Referring to FIG. 1, an input means 13 has a user interface function such as an operation panel, and can be used to display information and to perform an input operation. Through the input means 13, a transmission condition for sending image format data can be inputted. Information used to determine a desired client computer serving as a transmission destination of image format data can be specified as a transmission condition of the printing device. A storage means 11 stores control data and a control program executed by a control means 12 and various types of setting information specified through the input means. The input means 13 may be included in a printing device 21 or configured as a client computer which is connected to a network and which can display information and perform an input operation.

A network communication means 10 is used to connect the printing device 21 to a network, and is capable of receiving PDL data from a client computer which requests for printing and of sending image format data to a client computer which desires the image format data.

The control means 12 controls the network communication means 10, the input means 13, a memory means 15, the storage means 11, a print engine 14, all of which are connected thereto, based on the control program, the control data, and the various types of setting information stored in the storage means 11. The memory means 15 is a memory for storing data such as received PDL data, data associated with the PDL data, and data obtained by converting the PDL data. The print engine 14 is a printing means such as a printer for performing printing based on image format data. Alternatively, the print engine 14 may be a printing means such as a printer for performing printing based on pixel map format data. For example, in the printer, data for printing received from a client computer is converted into pixel map format data by the control means 12 and printing is performed based on the pixel map format data obtained through the conversion.

Figure 2:
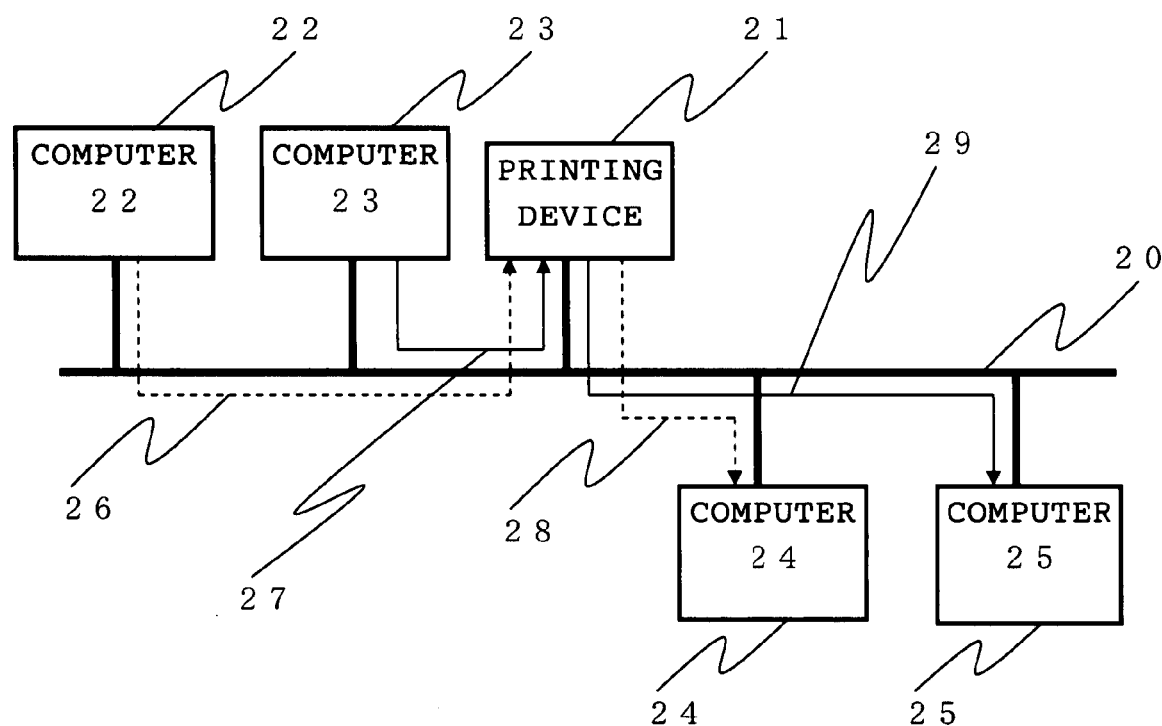
FIG. 2 is a block diagram showing a configuration of and data flow in a network printing system according to the embodiment of the present invention.

FIG. 2 is a block diagram showing a configuration of and data flow in a network printing system according to the embodiment of the present invention. A network 20 can be configured by any type of connection such as a typical LAN connection using Ethernet (registered trademark) or a token ring. A USB connection, and an IEEE1394 connection means may also be used. The printing device 21, which has been described with reference to FIG. 1, is connected to the network 20 via the network communication means 10.

In the printing device 21, a condition to send image format data and a client computer serving as a transmission destination can be set in advance using the input means 13.

The printing device 21 receives, via the network communication means 10, PDL data 26 sent from a print requesting client computer 22 connected to the network 20. At this time, the printing device 21 receives, in addition to the PDL data 26, various types of source information that indicate the source of the PDL data 26, such as the file name of the PDL data 26, the print requester name thereof, the computer name of the print requesting client computer 22 which has sent the PDL data 26, and the IP address thereof. The printing device 21 holds the PDL data 26 and the various types of source information in the memory means 15. The various types of source information are not particularly defined but preferably include information that can be obtained through a network protocol or various types of information that can be obtained by using a protocol exclusively used between the client computers and the printing device. For example, in a case of an LPR connection which is often used to connect the printing device in a network, it is assumed that the printing device can recognize the IP address of a client computer, the computer name thereof, and a login user name which was used to login the computer.

In the printing device 21 after receiving the PDL data 26, the control means 12 converts the PDL data 26 into pixel map format data for printing and stores the pixel map format data in the memory means 15. The pixel map format data stored in the memory means 15 is sent to the print engine 14 by the control means 12 and is printed on an actual sheet or the like.

When one page of pixel map format data is completed in the memory means 15, the control means 12 compares the various types of source information of the PDL data 26, which have been held in the memory means 15 upon reception of the PDL data 26, with the image format data transmission condition, which has been inputted in advance through the input means 13 and stored in the storage means 11. When the source information matches the condition, specifically, when the IP address of the client computer which has sent the PDL data, the IP address being one of the source information, matches the IP address of a PDL data transmission source client computer included in the transmission condition which has been specified in advance, the control means 12 converts the pixel map format data stored in the memory means 15 into general-purpose image format data such as TIFF data. The control means 12 sends the general-purpose image format data as transmission data 28 to an image receiving client computer 24 serving as an image format data transmission destination client computer, which has been specified in advance as a transmission destination in a case of this condition in the storage means 11 through the input means 13. At that time, a general-purpose image format such as TIFF may be stored once in the memory means 15 before transmission. A protocol used for transmission is not particularly defined but transmission can be performed by a shared-file system such as network file system (NFS) or by a unique protocol.

In the same way, the printing device 21 receives, via the network communication means 10, PDL data 27 sent from a print requesting client computer 23 connected to the network 20. At this time, various types of information that indicate the source of the PDL data 27 are also stored in the memory means 15.

In the printing device 21 after receiving the PDL data 27, the control means 12 converts the PDL data 27 into pixel map format data for printing, and the pixel map format data is printed on an actual sheet or the like at the print engine 14.

When one page of pixel map format data is completed in the memory means 15, the control means 12 compares the various types of source information of the PDL data 27, which have already been held, with the image data transmission condition, which has been specified in advance in the storage means 11 through the input means 13. When the source information matches the condition, the control means 12 converts the pixel map format data into general-purpose image format data. The control means 12 sends the general-purpose image format data as transmission data 29 to an image receiving client computer 25 serving as an image transmission destination client computer which has been specified as a transmission destination in advance in the storage means 11 through the input means 13.

As described above, according to the present invention, since a transmission condition and a transmission destination client computer are specified in advance in the printing device 21, only PDL data selected when various types of information which indicate the source of the PDL data and which can be obtained upon reception of the PDL data match a particular condition among multiple transmission conditions is returned to general-purpose image format data and is automatically sent. Alternatively, it is possible to perform an operation in which only PDL data satisfying a particular condition is printed but an image obtained therefrom is not sent, or an operation in which only the image format data of PDL data which does not satisfy any condition is automatically sent or is not sent. Further, when a transmission condition is satisfied, image format data can also be sent to multiple client computers. It is possible that multiple image formats such as TIFF and Portable Document Format (PDF) are displayed and a general-purpose image format used for data transmission can be specified in advance through the input means 13 from among the displayed formats. The image format of image format data to be sent may be specified by inputting a command corresponding to the image format through the input means 13.

Further, according to this device, when general-purpose image format data is sent, it is possible to embed various types of information indicating the source of PDL data which is the original data of the image format data, in the image format data, so as to associate the image format data with the PDL data and a print requesting client computer that has sent the PDL data. A method of embedding various types of source information in image format data may be determined in a desired way according to its image format unless an influence is given to the image when the image is referenced. For example, in a case of a TIFF format, source information can be embedded in a text format or an encrypted format following a tag such as an image description tag.

Further, according to this device, when image format data is sent to a client computer, the file name of the image format data can be generated from the source information and unique information generated by the printing device 21 per se. For example, it is possible to generate the file name of image format data by combining some or all items of source information, such as the file name of the PDL data, the computer name of a print requesting client computer, and the IP address thereof, and PDL data reception date and time and a sequential number uniquely generated by the printing device 21, and to send the image format data. A client computer that has received the image format data can determine the source of the image format data from the file name of the received image format data. How to generate the file name of image format data from various types of source information and unique information generated by the printing device 21 per se is specified in advance through the input means 13.

Further, according to this device, when image format data is sent to a client computer, it is possible to store source information in a file and send the file as the data 28 sent to the client computer 24 or as the data 29 sent to the client computer 25. The source information may be stored in a text file or an encrypted file. In the case of storing source information in a file, the source information file uses the same file name as the image format data file with its extension being changed, so it is possible to determine which image data file is associated with which source information file. Whether to send the source information file together with the image format data file to a client computer is specified in advance through the input means 13.

Further, according to this device, it is possible to hold, in the storage means 11, an operation log for each PDL data, indicating what kind of source information was obtained, what file name was added to image format data, and the image format data was sent to which client computer. The contents of the operation log can be printed by the printing device 21 when activated through the input means 13 or can be displayed on the input means 13 such as an operation panel.

Hereinafter, an operation example of the present invention will be described based on a flowchart of FIG. 3.

Figure 3:
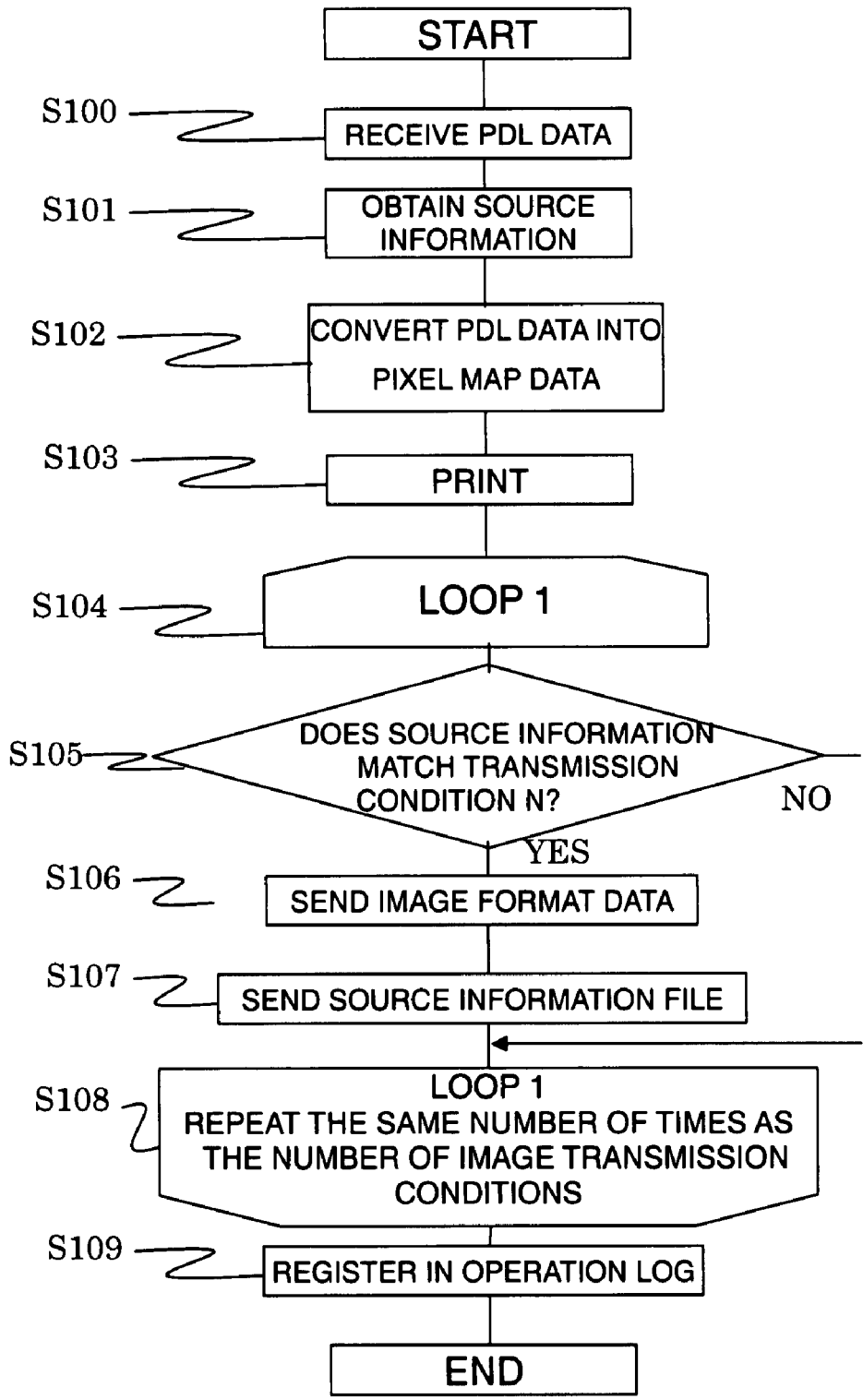
FIG. 3 is a flowchart example of printing processing performed in the network printing system shown in FIG. 2.

FIG. 3 is a flowchart example of printing processing performed in the network printing system shown in FIG. 2. In this device, a CPU is used as the control means 12, a flash memory is used as the storage means 11, a RAM is used as the memory means 15, and the control means 12 operates according to the program and the data of settings and conditions stored in the storage means 11.

In Step S100, the printing device receives PDL data. In Step S101, the printing device also receives various information indicating the source of the PDL data, such as the file name of the PDL data, the print requestor name thereof, the computer name of a print requesting client computer that has sent the PDL data, and the IP address thereof, and holds the PDL data and the various information in the memory means 15.

In Step S102, the printing device 21 converts the received PDL data into printable pixel map format data, and performs printing in Step S103.

The printing device 21 repeats Steps S104 to S108 the same number of times as the number of image transmission conditions registered in advance. In Step S105 during the repetition processing, the source information of the PDL data received this time is compared with each of the image transmission conditions registered in advance. When it is determined that the source information matches the image transmission condition, the printing device 21 converts the pixel map format data into general-purpose image format data, embeds the source information in the image format data, and sends the image format data to a image transmission destination client computer registered in advance, in Step S106. In Step S107, the printing device 21 stores the source information in a file and sends the source information file to the client computer to which the image format data has been sent.

After completion of the repetition processing, in Step S109, the printing device registers, in an operation log, processing contents indicating whether the source information of the PDL data received this time and the image format data thereof have been sent, and, when the source information and the image format data have been sent, the destination client computer and their file names.

What is claimed is:

1. A printing device comprising:
   network communication means for connecting the printing device to at least one client computer;
   input means for performing an input to select an image format of general-purpose image format data from among multiple image formats, and for performing an input to set a transmission condition for sending the general-purpose image format data to the at least one client computer;
   storage means for storing the selected image format and the set transmission condition inputted through the input means;
   control means for converting page description language (PDL) data sent from the at least one client computer to the printing device into pixel map format data, converting the pixel map format data into general-purpose image format data based on the image format stored in the storage means, and performing a control operation such that, based on the transmission condition stored in the storage means, the general-purpose image format data and a source information file containing source information indicating the source of the PDL data are sent to the at least one client computer via the network communication means, the transmission condition including information indicating the source of the PDL data;
   memory means for storing the pixel map format data obtained through the conversion performed by the control means; and
   a printer for printing the pixel map format data on a sheet.

2. A printing device according to claim 1; wherein the network communication means connects the printing device to a first client computer that sends the PDL data to the printing device together with source information indicating a source of the PDL data and to a second client computer that receives the general-purpose image format data in accordance with the control operation by the control means.

3. A printing device according to claim 1; wherein the transmission condition comprises a plurality of conditions.

4. A printing device according to claim 3; wherein the source information indicating the source of the PDL data is received together with the PDL data sent by the client computer; and wherein the control means performs a control operation to compare the source information received with the PDL data with the transmission condition stored in the storage means, and when the source information received with the PDL matches information indicating the source of the PDL data set in the transmission condition stored in the storage means, performs a control operation to automatically send the general-purpose image format data to the at least one client computer via the network communication means.

5. A printing device according to claim 4; wherein the transmission condition stored in the storage means further includes information indicating a transmission destination of the at least one client computer.

6. A printing device according to claim 4; wherein the transmission condition stored in the storage means further includes information indicating transmission destinations of a plurality of client computers; and wherein the control means performs the control operation to automatically send the general-purpose image data to the plurality of client computers.

7. A printing device according to claim 1; wherein when the control means converts the PDL data into the pixel map format data and converts the pixel map format data into the general-purpose image format data, the control means embeds in the general-purpose image format data the information indicating the source of the PDL data included in the transmission condition.

8. A printing device according to claim 1; wherein the control means generates a file name of the general-purpose image format data from the information indicating the source of the PDL data included in the transmission condition when the PDL data is converted into the pixel map format data, the pixel map format data is converted into the general-purpose image format data, and the general-purpose image format data is sent to the client computer.

9. A printing device according to claim 8; wherein the control means generates the file name of the general-purpose image format data by combining multiple pieces of source information.

10. A printing device according to claim 1; wherein when the control means performs the control operation, a file name identical to that of the general-purpose image format data is added to the source information file and is provided with a file extension to distinguish the file name from that of the general-purpose image format data.

11. A printing device according to claim 1; further comprising means for determining whether the source information file is sent to the at least one client computer together with the general-purpose image format data.

12. A printing device according to claim 1; wherein the storage means stores, as an operation log, file names of the PDL data sent from the at least one client computer and of the general-purpose image format data sent to the at least one client computer by the control means.

13. A printing device according to claim 12; wherein the printer prints the operation log by a print activation command input by the input means.

14. A printing device according to claim 12; further comprising display means for displaying the operation log.

15. A network printing system comprising: a printing device according to claim 1; and at least one client computer for connection to the printing device via the network communication means.

* * * * *